(12) United States Patent
Kim et al.

(10) Patent No.: US 8,976,083 B2
(45) Date of Patent: Mar. 10, 2015

(54) THREE-DIMENSIONAL IMAGE DISPLAY DEVICE AND METHOD FOR DRIVING THE SAME

(75) Inventors: Ji-Sun Kim, Seoul (KR); Chongchul Chai, Seoul (KR); Yeong-Keun Kwon, Yongin-si (KR)

(73) Assignee: Samsung Display Co., Ltd., Yongin (KR)

(*) Notice: Subject to any disclaimer, the term of this patent is extended or adjusted under 35 U.S.C. 154(b) by 337 days.

(21) Appl. No.: 13/602,863

(22) Filed: Sep. 4, 2012

(65) Prior Publication Data

US 2013/0257925 A1 Oct. 3, 2013

(30) Foreign Application Priority Data

Mar. 28, 2012 (KR) .................. 10-2012-0031865

(51) Int. Cl.
  *G09G 5/00* (2006.01)
(52) U.S. Cl.
  USPC .................. 345/6; 345/419; 345/695; 348/51
(58) Field of Classification Search
  USPC .................. 345/6, 55, 87, 204, 419, 694, 695; 348/51, 55, 56
  See application file for complete search history.

(56) References Cited

U.S. PATENT DOCUMENTS

| | | | |
|---|---|---|---|
| 2007/0242068 A1* | 10/2007 | Han et al. | 345/427 |
| 2008/0079001 A1* | 4/2008 | Umezaki et al. | 257/59 |
| 2008/0211976 A1* | 9/2008 | Nam et al. | 349/15 |
| 2009/0303232 A1 | 12/2009 | Moon et al. | |
| 2010/0265230 A1* | 10/2010 | Kang | 345/211 |
| 2011/0032342 A1 | 2/2011 | Kato et al. | |
| 2011/0063533 A1 | 3/2011 | Kim et al. | |
| 2011/0169871 A1* | 7/2011 | Suzuki et al. | 345/690 |
| 2011/0205344 A1 | 8/2011 | Lee | |
| 2011/0285697 A1* | 11/2011 | Lee et al. | 345/419 |
| 2012/0154467 A1* | 6/2012 | Hwang et al. | 345/694 |
| 2013/0235006 A1* | 9/2013 | Shin et al. | 345/204 |
| 2013/0271504 A1* | 10/2013 | Kim et al. | 345/690 |

FOREIGN PATENT DOCUMENTS

| | | |
|---|---|---|
| KR | 10-2006-0087711 | 8/2006 |
| KR | 10-2010-0128019 | 12/2010 |
| KR | 10-2011-0057535 | 6/2011 |
| KR | 10-2011-0101522 | 9/2011 |
| KR | 10-2011-0108033 | 10/2011 |
| KR | 10-2011-0109405 | 10/2011 |

* cited by examiner

*Primary Examiner* — Joe H Cheng
(74) *Attorney, Agent, or Firm* — H.C. Park & Associates, PLC

(57) ABSTRACT

A three-dimensional (3D) image display device includes data lines, gate lines crossing the data lines, sub-pixels arranged in areas between the data lines and the gate lines, a data driver that drives the data lines, a first gate driver that drives first gate lines from among the gate lines, a second gate driver that drives second gate lines from among the gate lines, and a timing controller that controls the data driver, the first gate driver, and the second gate drivers according to an image signal and a control signal. The second gate driver does not drive the second gate lines during a 3D display mode.

16 Claims, 12 Drawing Sheets

THREE-DIMENSIONAL IMAGE DISPLAY DEVICE AND METHOD FOR DRIVING THE SAME

CROSS-REFERENCE TO RELATED APPLICATION

This application claims priority from and the benefit of Korean Patent Application No. 10-2012-0031865, filed on Mar. 28, 2012, which is hereby incorporated by reference for all purposes as if fully set forth herein.

BACKGROUND

1. Field

Exemplary embodiments of the present invention relate to a three-dimensional (3D) image display device.

2. Discussion of the Background

The demands for a 3D image display device are increasing. In general, a 3D is image display device may be classified into a glass type 3D image display device that realizes a 3D image with glasses worn by a user and a glassless type 3D image display device that realizes the 3D image without the use of glasses.

The glass type 3D image display device may be classified into a shutter glass type 3D image display device and a polarizing film type 3D image display device. The glassless type 3D image display device may be classified into a parallax barrier type 3D image display device and a lenticular type 3D image display device.

The polarizing film type 3D image display device may include a patterned retarder disposed on a display panel. The polarizing film type 3D image display device realizes a 3D image using a polarization characteristic of the patterned retarder and a polarization characteristic of a polarization glasses worn by a user. In a polarizing film 3D device, a crosstalk between left image and right image may be smaller and image quality may be increased compared with other types of the 3D image display device.

Generally, a 3D image display device is configured to display not only a 3D image but also a two-dimensional (2D) image. However, since the 3D image display device is designed for the display of a 3D image, deterioration in display quality of the 2D image may occur. Therefore, research and development of a 3D image display device capable of both the display of a 2D image and the 3D image are required. In addition, a design change to further reduce power consumption in the 3D image display device as the 3D image display device, e.g., a television set, is increased in size is desired.

The above information disclosed in this Background section is only for enhancement of understanding of the background of the invention and therefore it may contain information that does not form any part of the prior art.

SUMMARY

Exemplary embodiments of the present invention provide a 3D image display device to display a 2D image and 3D image and to reduce power consumption by a 3D display device.

Exemplary embodiments of the present invention also provide a method of driving the 3D image display device.

Additional features of the invention will be set forth in the description which follows, and in part will be apparent from the description, or may be learned by practice of the invention.

An exemplary embodiment of the present invention discloses a three-dimensional (3D) image display device, including: a plurality of data lines; a plurality of gate lines crossing the data lines; a plurality of sub-pixels arranged between the data lines and the gate lines; a data driver configured to drive the data lines; a first gate driver configured to drive first gate lines of the gate lines; a second gate driver configured to drive second gate lines of the gate lines; and a timing controller configured to control the data driver, the first gate driver, and the second gate driver according to an image signal and a control signal, wherein the second gate driver is not driven during a 3D display mode.

An exemplary embodiment of the present invention discloses a method of driving a three-dimensional (3D) image display device that includes a plurality of sub-pixels arranged between a plurality data lines and a plurality of gate lines crossing the data lines, the method including: receiving an image signal, a control signal, and a mode signal; controlling a first gate driver according to the image signal and the control signal if the mode signal indicates a 3D is display mode to drive first gate lines of the plurality of gate lines to be sequentially driven; and controlling a second gate driver if the mode signal indicates the 3D display mode to not drive second gate lines of the plurality of gate lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
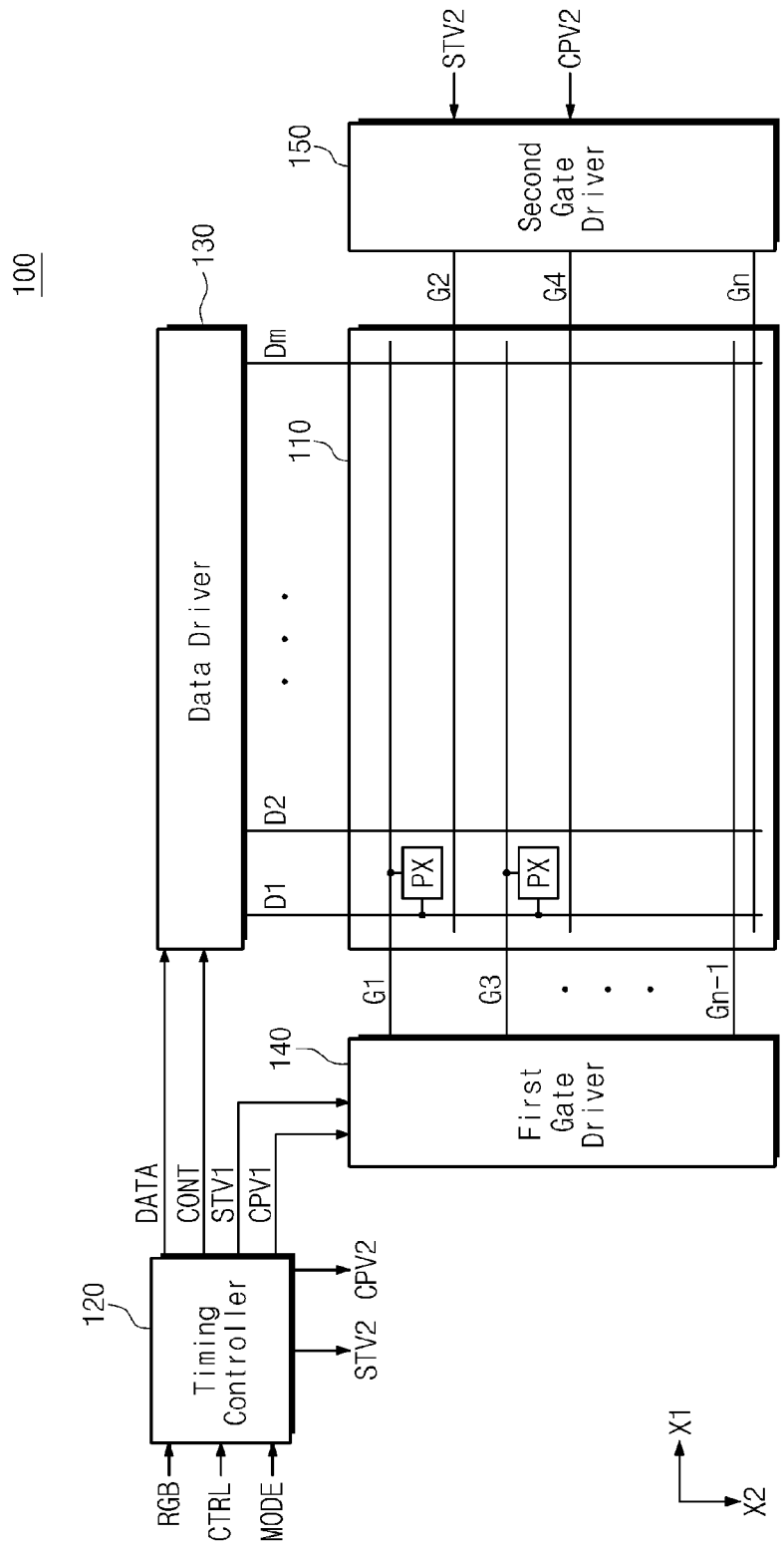
FIG. 1 is a block diagram of a 3D image display device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of elements, components, and/or sections may be exaggerated for clarity. Like reference numerals in the drawings denote like elements.

It will be understood that, although the terms first, second, third etc. may be used herein to describe various elements, components, layer, and/or sections, these elements, components, layer, and/or sections should not be limited by these terms. These terms are only used to distinguish one element, component, layer, or section from another element, component, layer, or section. Thus, a first element, component, layer, or section discussed below could be is termed a second element, component, layer, or section without departing from the teachings of the present invention.

It will be understood that when an element or layer is referred to as being "on" or "connected to" another element components, layer, and/or sections, it can be directly on or directly connected to the other element components, layer, and/or sections, or intervening elements components, layer, and/or sections may be present. In contrast, when an element components, layer, and/or sections is referred to as being "directly on" or "directly connected to" another element components, layer, and/or sections, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIG. 1 is a block diagram of a 3D image display device according to an exemplary embodiment of the present invention. Hereinafter, a 3D image display device will be described as if it is a liquid crystal display, but the 3D image display device is not to be limited to the liquid crystal display. Various display devices, such as a field emission display (FED), a plasma display panel (PDP), an inorganic light emitting diode display, an organic light emitting diode display, an electrophoresis display (EPD), etc., may be used as a 3D image display device.

Referring to FIG. 1, the 3D image display device 100 includes a display panel 110, a timing controller 120, a data driver 130, a first gate driver 140, and a second gate driver 150. The 3D image display device 100 may further includes a backlight unit (not shown) disposed under the display panel 110.

The display panel 110 includes a plurality of gate lines G1 to Gn extending in a first direction X1, a plurality of data lines D1 to Dm extending in a second direction X2 to cross is the gate lines G1 to Gn, and a plurality of sub-pixels PX arranged in a matrix form.

Although not shown in FIG. 1, each sub-pixel may include a thin film transistor connected to a corresponding gate line of the plurality of gate lines and a corresponding data line of the plurality of data lines, a liquid crystal capacitor connected to the thin film transistor, and a storage capacitor connected to the thin film transistor.

The timing controller 120 may be configured to receive a first image signal RGB, control signal CTRL, and a mode signal MODE from an external device (not shown). The timing controller 120 may convert the first image signal RGB to a second image signal DATA according to the operational conditions of the display panel 110 on the basis of the control signal CTRL and may apply the second image signal DATA and a control signal CONT to the data driver 130. The control signal CONT may include a plurality of signals, such as a vertical synchronization signal Vsync, a horizontal synchronization signal Hsync, a main clock signal MCLK, a data enable signal, a horizontal synchronization start signal STH, a clock signal HCLK, and a line latch signal TP. The timing controller 120 may apply a first vertical synchronization signal STV1 and a first vertical clock signal CPV1 to the first gate driver 140 and may apply a second vertical synchronization signal STV2 and a second vertical clock signal CPV2 to the second gate driver 150.

The 3D image display device 100 may operate in a 2D display mode to display a 2D image and in a 3D display mode to display a 3D image. The timing controller 120 is configured to control the display panel 110 to display a 2D image if the mode signal MODE indicates a 2D display mode is selected and to control the display panel 110 to display a 3D image if the mode signal MODE indicates a 3D display mode is selected.

The data driver 130 may be configured to output gray-scale voltages to drive the is data lines D1 to Dm according to the second image signal DATA and the control signal CONT from the timing controller 120.

The first gate driver 140 may be configured to drive first gate lines G1, G3, . . . , Gn−1 of the gate lines G1 to Gn according to the first vertical synchronization start signal STV1 and the first vertical clock signal CPV1.

The second gate driver 150 may be configured to drive second gate lines G2, G4, . . . , Gn of the gate lines G1 to Gn according to the second vertical synchronization start signal STV2 and the second vertical clock signal CPV2.

The first gate driver 140 and the second gate driver 150 may be configured to include a gate driving integrated circuit, but it is not to be limited thereto or thereby. The first gate driver 140 and the second gate driver 150 may be configured to include an amorphous silicon gate circuit using an amorphous silicon thin film transistor (a-Si TFT). The first gate driver 140 and the second gate driver 150 may be disposed to the left side and right side, respectively, of the display panel 110, with the display panel 110 interposed there between.

Switching transistors arranged in the same one row may be turned on if one gate line is applied with a gate-on voltage VON by the first gate driver 140 or the second gate driver 150, to which the switching transistors are connected, and the data driver 130 applies the gray-scale voltages corresponding to the data signal DATA to the data lines D1 to Dm. The gray-scale voltages provided to the data lines D1 to Dm may be applied to corresponding sub-pixels, respectively, through the turned-on switching transistors.

If the mode signal MODE indicates a 2D display mode, the timing controller 120 may apply the first vertical synchronization start signal STV1 and the first vertical clock signal CPV1 to the first gate driver 140 according to the control signal CTRL and may apply the second is synchronization start signal STV2 and the second vertical clock signal CPV2 to the second gate driver 150 according to the control signal CTRL. If the mode signal MODE indicates a 3D display mode, the timing controller 120 may apply the first vertical synchronization start signal STV1 and the first vertical clock signal CPV1 to the first gate driver 140 according to the control signal CTRL and does not apply the second synchronization start signal STV2 and the second vertical clock signal CPV2 to the second gate driver 150 according to the control signal CTRL. The second gate lines G2, G4, . . . , Gn are not driven during the 3D display mode. The operation of the 3D image display device 100 in the 2D display mode and the 3D display mode will be described in detail below.

Figure 2:
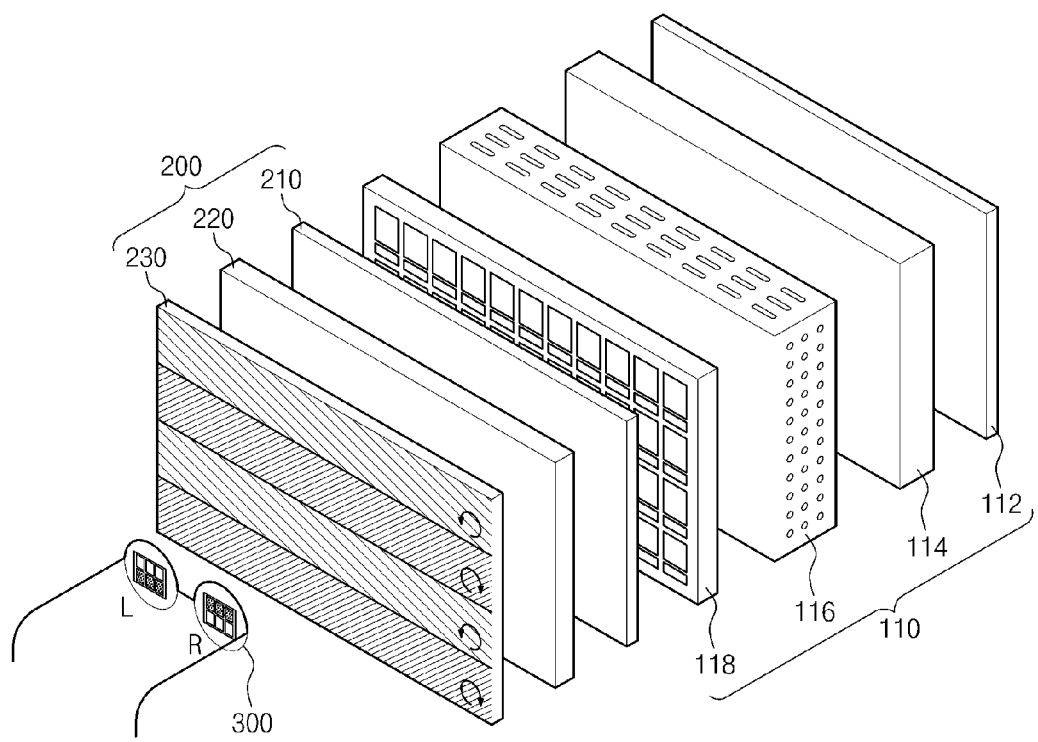
FIG. 2 is an exploded perspective view of the 3D image display device of FIG. 1.

FIG. 2 is an exploded perspective view of the 3D image display device of FIG. 1.

Referring to FIG. 2, the 3D image display device 100 includes the display panel 110 and a polarizing assembly 200.

The display panel 110 may have a rectangular shape and may display an image through a display area thereof. The display panel 110 may include a lower polarizing plate 112, a lower substrate 114, an upper substrate 118, and a liquid crystal layer 116 interposed between the lower substrate 114 and the upper substrate 118.

The lower substrate 114 may include a thin film transistor array disposed thereon. The thin film transistor array may include the data lines D1 to Dm to which red, green, and blue data voltages may be applied, the gate lines G1 to Gn to which a gate pulse may be applied, a plurality of thin film transistors each of which may be electrically connected to the corresponding gate line of the gate lines G1 to Gn and the corresponding data line of the data lines D1 to Dm, pixel electrodes to charge a liquid crystal cells with the data voltages, and storage capacitors to maintain the voltage charge in the liquid crystal cells.

Although not shown in FIG. 2, a color filter or a black matrix may be disposed on at least one of the lower substrate 114 and the upper substrate 118. A common electrode, which is used to form an electric field in cooperation with the pixel electrodes, may be disposed on the upper substrate 118 in a vertical electric field driving manner, such as a twisted nematic (TN) mode and a vertical alignment (VA) mode, and may be disposed on the lower substrate 114 in a horizontal electric field driving manner, such as an in-plane switching (IPS) mode and a fringe field switching (FFS) mode. The lower substrate 114 and the upper substrate 118 may include an alignment layer disposed on an inner surface thereof to set a pretilt angle of liquid crystal molecules.

The first gate driver 140 and the second gate driver 150 illustrated in FIG. 1 are disposed at both sides of the lower substrate 114 on which the thin film transistor array may be disposed.

The lower polarizing plate 112 may be configured to polarize the light provided from a backlight unit (not shown). The liquid crystal molecules of the liquid crystal layer 116 may be aligned in a reference direction according to voltages applied to the pixel electrode and the common electrode to control a transmittance of the light passing there through. Accordingly, the display panel 110 displays selected images.

The sub-pixels PX may be arranged on the display panel 110 to allow a left-eye image L and a right-eye image R to be alternately displayed in a line-by-line manner. The sub-pixels PX will be described in detail below.

The polarizing assembly 200 includes a polarizing plate 210, a glass substrate 220, and a patterned retarder 230.

The polarizing plate 210 may be disposed on the upper substrate 118 and may be is configured to serve as an analyzer to transmit a linearly-polarized light from the light incident thereto after passing through the liquid crystal layer 116 of the display panel 110.

The glass substrate 220 may be coupled with the polarizing plate 210 to support the polarizing plate 210. The patterned retarder 230 may include first retarder patterns and second retarder patterns alternately arranged with the first retarder patterns. The first retarder pattern and the second retarder pattern may be arranged in a line-by-line manner. The first retarder pattern and the second retarder pattern may be alternately arranged with each other. Every line in the first retarder pattern and the second retarder pattern may be inclined at an angle of about +45 degrees or about −45 degrees with respect to a transmission axis of the polarizing plate 210. The first retarder pattern and the second retarder pattern are configured to delay a phase of the light by λ/4 using a birefringence medium. The first retarder pattern may have an optical axis substantially perpendicular to an optical axis of the second retarder patterns. Accordingly, the first retarder pattern may be disposed corresponding to lines, in which the left-eye image may be displayed, to convert the light for the left-eye image to a first polarized state (for example, a circularly polarized state or a linearly polarized state). The second retarder pattern may be disposed corresponding to lines, in which the right-eye image may be displayed, to convert the light for the right-eye image to a second polarized state (a circularly polarized state or a linearly polarized state). For instance, the first retarder pattern may include a polarizing filter that transmits a left circularly polarized light and the second retarder pattern may include a polarizing filter that transmits a right circularly polarized light.

Polarizing glasses 300 may include a polarizing film disposed on a left-eye glass thereof so as to transmit the first polarized component and a polarizing film disposed on a right-eye glass thereof so as to transmit the second polarized component. Thus, a viewer wearing the is polarizing glasses 300 may recognize the left-eye image through the left eye and the right-eye image through the right eye, so that the viewer perceives the image displayed on the display panel 110 as a 3D image.

Figure 3:
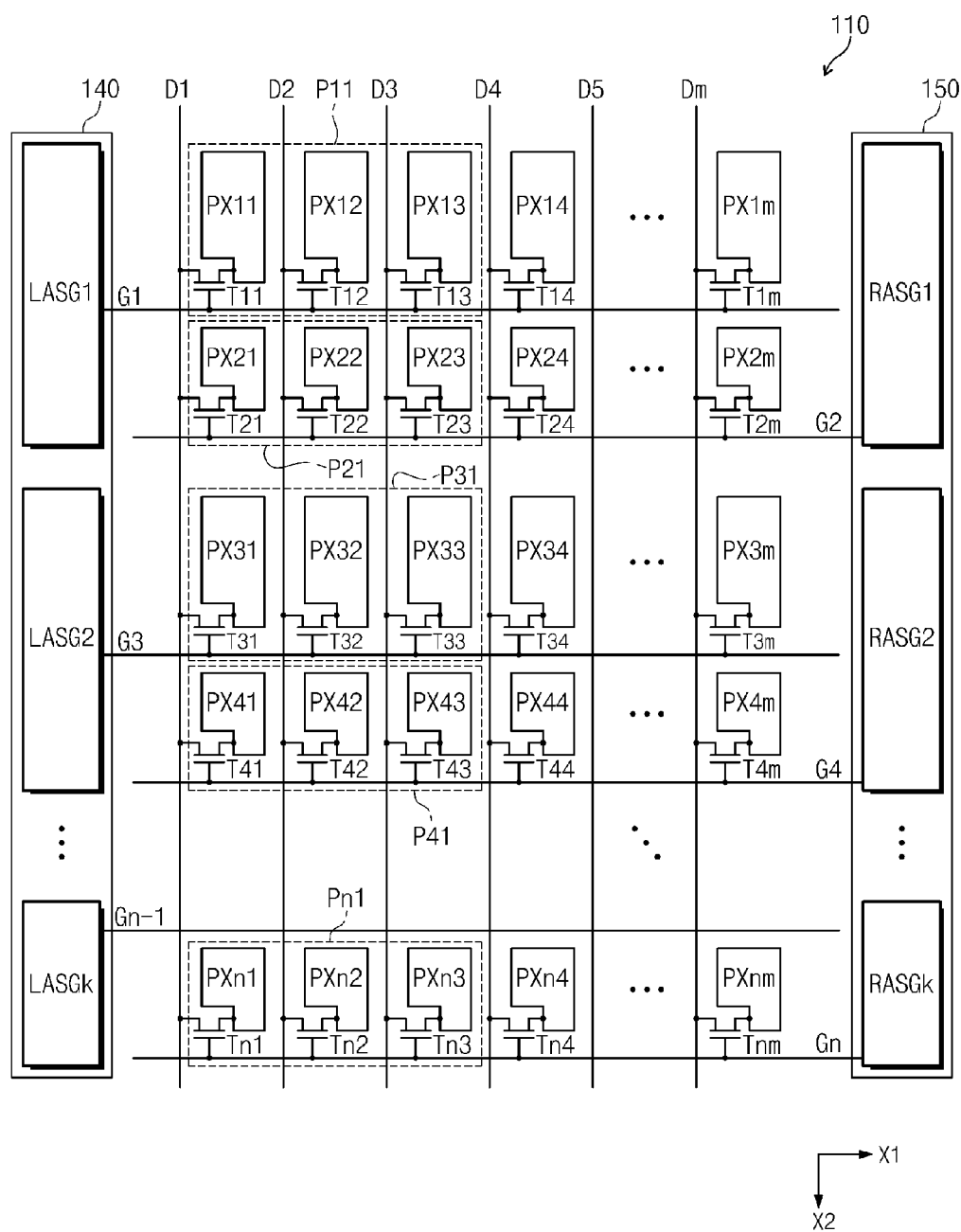
FIG. 3 is a diagram illustrating a display panel of FIG. 2.

FIG. 3 is a diagram illustrating a display panel of FIG. 2.

Referring to FIG. 3, the display panel 110 includes the pixel electrodes PX11 to PXnm and the thin film transistors T11 to Tnm, which are arranged in areas defined by the data lines D1 to Dm and the gate lines G1 to Gn. Each sub-pixel PX may include one pixel electrode and one thin film transistor. One pixel electrode and one thin film transistor may form one sub-pixel PX. One pixel may include three sub-pixels successively arranged in the first direction X1 in which the gate lines G1 to Gn extend. A first pixel P11 may include pixel electrodes PX11, PX12, and PX13 and thin film transistors T11, T12, and T13, and a second pixel P21 includes pixel electrode PX21, PX22, and PX23 and thin film transistors T21, T22, and T23. The pixel electrodes PX11 to PXnm may sequentially display red, green, and blue colors in the first direction X1 beginning with the pixel electrode PX11 adjacent to the first gate driver 140. For example, the three pixel electrodes PX11, PX12, and PX13 may display the red color, the green color, and the blue color, respectively. Although not shown in the figures, each sub-pixel may include a storage capacitor.

The first gate driver 140 may be disposed at a left side of the display panel 110 and the second gate driver 150 may be disposed at a right side of the display panel 110. The first gate driver 140 may include k amorphous silicon gate (ASG) circuits LASG1 to LASGk (where k is a natural number and k=n/2) and the second gate driver 150 may include k ASG circuits RASG1 to RASGk. The ASG circuits LASG1 to LASGk drive the first gate lines G1, G3, . . . , Gn−1, respectively, and the ASG circuits RASG1 to RASGk drive the second gate lines G2, G4, . . . , Gn, respectively.

If first gate driver 140 and second gate driver 150 are separated from each other and disposed on both sides of the display panel 110, a circuit width of the first gate driver 140 and second gate driver 150 may be reduced in the first direction X1. Thus, a narrow bezel of the display panel 110 may be easily realized.

Gate terminals of odd-numbered thin film transistors in the second direction X2 are connected to the first gate lines G1, G3, . . . , Gn−1, e.g., odd-numbered gate lines, extended from the first gate driver 140. Gate terminals of even-numbered thin film transistors in the second direction X2 are connected to the second gate lines G2, G4, . . . , Gn, e.g., even-numbered gate lines, extended from the second gate driver 150. First pixels P11, P31, . . . P(n−1)1 may be connected to the first gate lines G1, G3, . . . , Gn−1, respectively, and second pixels P21, P41, . . . , Pn1 may be connected to the second gate lines G2, G4, . . . , Gn, respectively.

During operation in a 2D display mode, the first gate driver 140 may drive the first gate lines G1, G3, . . . , Gn−1 and the second gate driver 150 may drive the second gate lines G2, G4, . . . , Gn. In contrast, during a 3D display mode, the first gate driver 140 may drive the first gate lines G1, G3, . . . , Gn−1 but the second gate driver 150 does not drive the second gate lines G2, G4, . . . , Gn. Thus, the second pixels P21, P41, . . . , Pn1 may be connected to the second gate lines G2, G4, . . . , Gn, respectively, to display a black image. Since the second pixels P21 to Pn1 display the black image while the first pixels P11 to P(n−1)1 display the 3D image, the second pixels P21, P41, . . . , Pn1 may serve as black stripes. The black stripes may widen a vertical viewing angle of the 3D display device if a 3D image is displayed and a crosstalk between the first pixels P11 to P(n−1)1 may be reduced.

Figure 4:
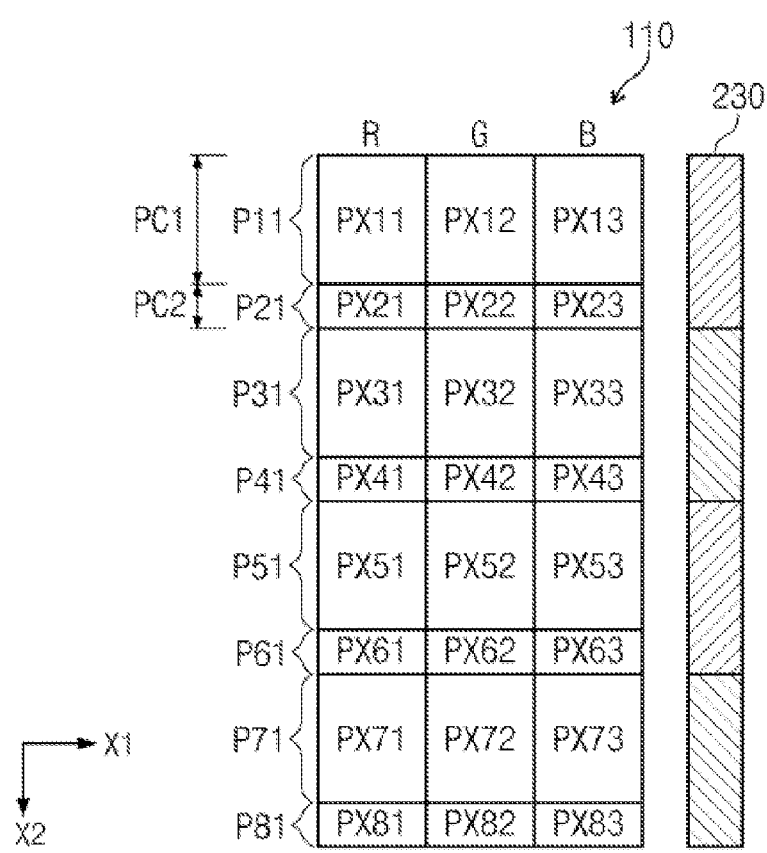
FIG. 4 is a diagram illustrating a 2D display mode of the display panel of FIG. 3.
Figure 5:
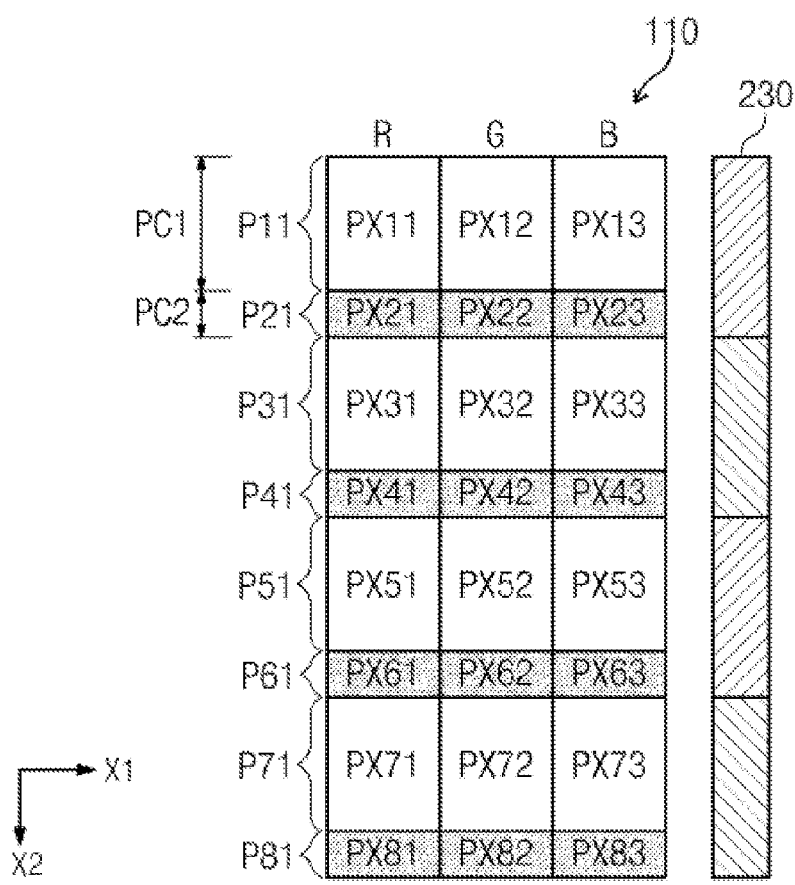
FIG. 5 is a diagram illustrating a 3D display mode of the display panel of FIG. 3.

FIG. 4 is a diagram illustrating a 2D display mode of the display panel of FIG. 3. FIG. 5 is a diagram illustrating a 3D display mode of the display panel of FIG. 3. FIG. 4 and FIG. 5 will be described with reference to the sub-pixels of FIG. 3, but are not limited thereto.

Referring to FIG. 4 and FIG. 5, a length in the second direction X2 of each of the first pixels P11, P31, P51, and P71, that is, a vertical pitch PC1 of each of the first pixels P11, P31, P51, and P71, is longer than a vertical pitch PC2 of each of the second pixels P21, P41, P61, and P81. The vertical pitch PC2 of the second sub-pixels may a vertical viewing angle and the brightness of the 3D image if a 3D image is displayed. Therefore, the vertical pitch PC1 of the first sub-pixels P11, P31, P51, and P71 and the vertical pitch PC2 of the second sub-pixels P21, P41, P61, and P81 may be selected according to the vertical viewing angle and the brightness of the 3D image.

In the 2D display mode, the first image signal RGB may be displayed in the first pixels P11, P31, P51, and P71 connected to the first gate lines G1, G3, . . . , Gn−1 and the second pixels P21, P41, P61, and P81 connected to the second gate lines G2, G4, . . . , Gn as shown in FIG. 3 and FIG. 4.

In the 3D display mode, the first image signal RGB may be displayed in the first pixels P11, P31, P51, and P71 connected to the first gate lines G1, G3, . . . , Gn−1, and the second pixels P21, P41, P61, and P81 connected to the second gate lines G2, G4, . . . , Gn may display the black image as shown in FIG. 3 and FIG. 5. Thus, the second pixels P21, P41, P61, and P81 may serve as the black stripes during the 3D display mode.

Two first pixels P11 and P51 of the first pixels P11, P31, P51, and P71 may display the left-eye image and two first pixels P31 and P71 of the first pixels P11, P31, P51, and P71 may display the right-eye image. The 3D image display device 100 may alternately displays the left-eye image and the right-eye image on the display panel 110, and the 3D image may be realized by the polarization characteristic of the patterned retarder and the polarization characteristic of the polarizing glasses 300 worn by the user. The left-eye image and the right-eye image may be spatially separated from each other to realize the 3D image. A visibility of a 3D image may be deteriorated by the crosstalk generated in the vertical viewing angle. For example, if the viewer watches the display panel 110 at an upper position or a lower position of the display panel 110, a crosstalk, in which the left-eye image and the right-eye image overlap with each other while passing through the patterned retarder 230, may be generated in the vertical viewing angle larger than a reference angle in comparison with a front viewing angle. The second pixels P21, P41, P61, and P81 may serve as active black stripes during the 3D display mode. The first pixels P11 and P51 may display the left-eye image and may be separated from the first pixels P31 and P71 in which the right-eye image may be displayed. The 3D image display device 100 may reduce crosstalk.

Figure 6:
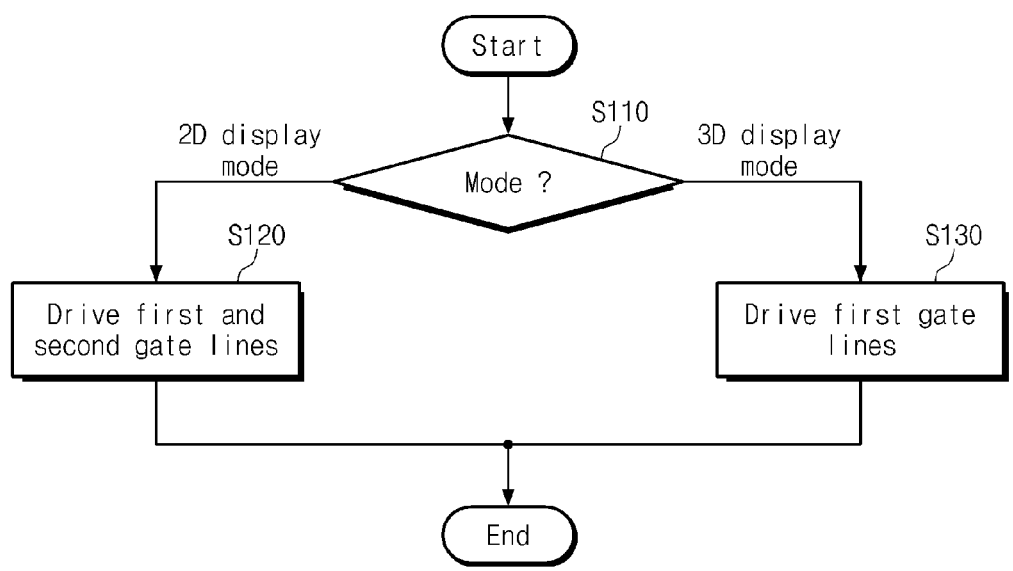
FIG. 6 is a flowchart of a method for switching modes in a 3D image display device according to an exemplary embodiment of the present invention.
Figure 7:
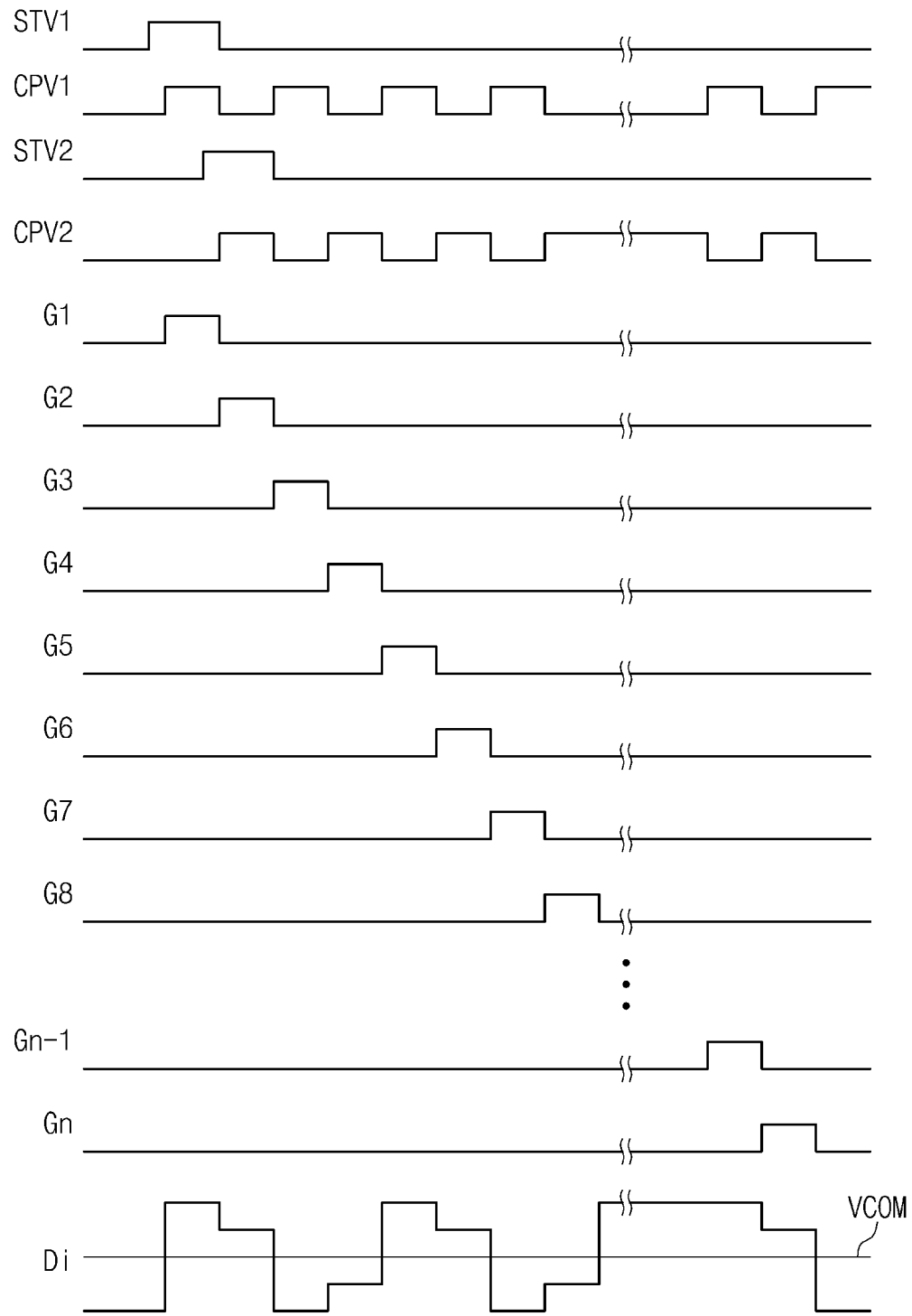
FIG. 7 is a timing diagram of a 3D image display device in a 2D display mode according to an exemplary embodiment of the present invention.
Figure 8:
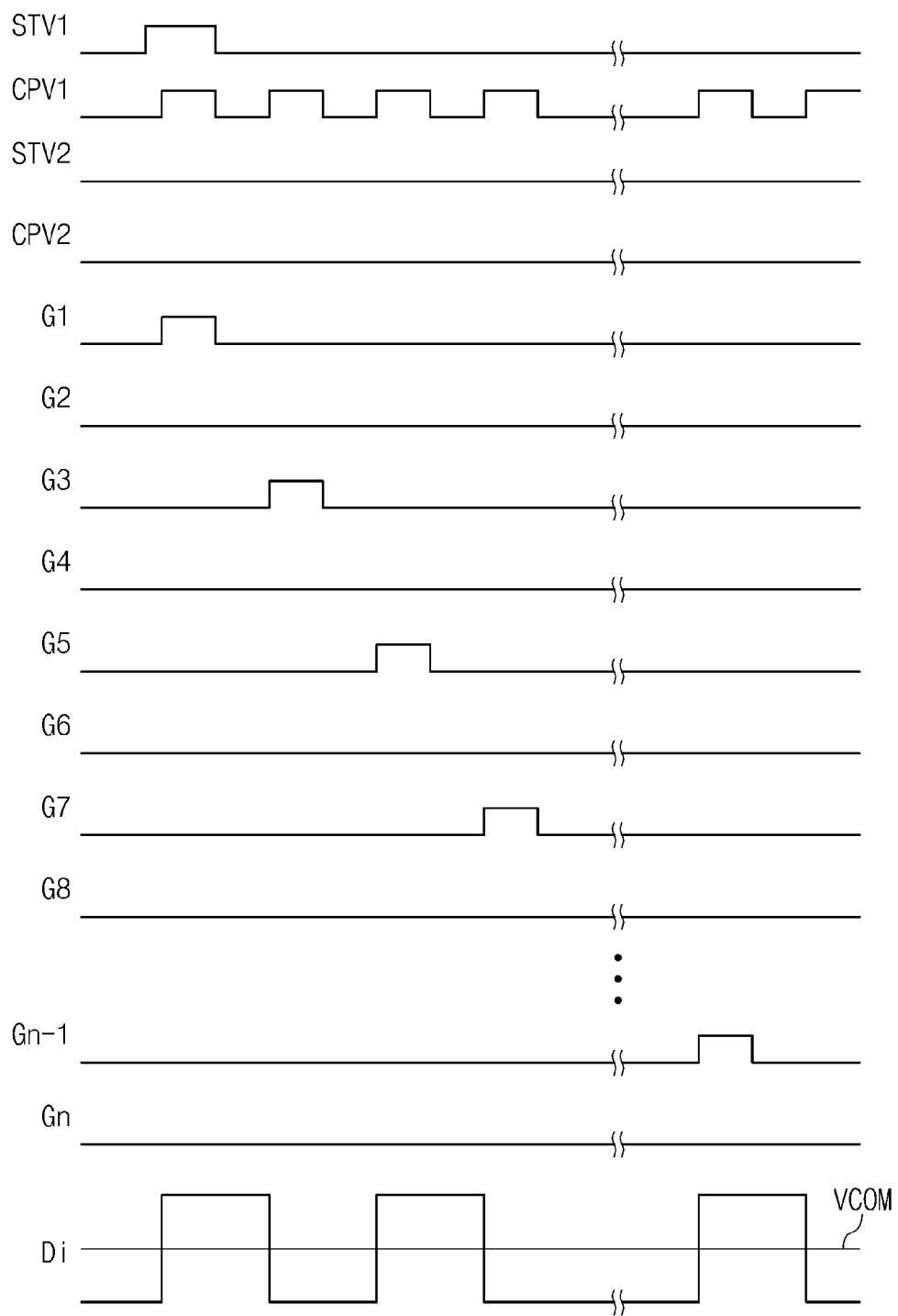
FIG. 8 is a timing diagram of a 3D image display device in a 3D display mode is according to an exemplary embodiment of the present invention.

FIG. 6 is a flowchart of a method for switching modes in a 3D image display device according to an exemplary embodiment of the present invention. FIG. 7 is a timing diagram of a 3D image display device in a 2D display mode according to an exemplary embodiment of the present invention. FIG. 8 is a timing diagram of a 3D image display device in a 3D display mode according to an exemplary embodiment of the present invention. FIG. 6, FIG. 7, FIG. 8 will be described with reference to the 3D image display device 100 of FIG. 1, but are not limited thereto.

Referring to FIG. 1, FIG. 6, FIG. 7 and FIG. 8, in operation S110, the 3D image display device 100 determines a display mode for an image. The timing controller 120 may check the mode signal MODE from the external device (not shown) to determine the selected display mode. In operation S120, if the display mode is determined to be a 2D display mode (i.e., the mode signal MODE indicates a 2D display mode), the 3D image display device drives the first gate lines and the second gate lines. The timing controller 120 may apply the first vertical synchronization start signal STV1 and the first vertical clock signal CPV1 to the first gate driver 140 and may apply the second vertical synchronization start signal STV2 and the second vertical clock signal CPV2 to the second gate driver 150. Accordingly, the first gate lines G1, G3, . . . , Gn−1 and the second gate lines G2, G4, . . . , Gn may be sequentially driven to display a 2D image.

In operation S130, the 3D image display device 100 If the display mode is determined to be a 2D display mode (i.e., the mode signal MODE indicates the 3D display mode), the 3D image display device drives the first gate lines. The timing controller 120 may apply the first vertical synchronization start signal STV1 and the first vertical clock signal CPV1 to the first gate driver 140 but does not apply the second vertical synchronization start signal STV2 and the second vertical clock signal CPV2 to the second gate driver 150. Accordingly, the first gate lines G1, G3, . . . , Gn may be sequentially driven to display the 3D image. Since the second gate lines G2, G4, . . . , Gn are not driven during the 3D display mode, the second pixels P11 to Pn1 connected to the second gate lines G2, G4, . . . , Gn display a black image.

Referring to FIG. 7, the signal used to drive the data line Di (1≤i≤m) in the 2D display mode may have a frequency of about 240 Hz. If the same signal is used to drive the data line Di in a 3D display mode shown, as illustrated in FIG. 8, the frequency of the data line Di may be about 120 Hz. The timing controller 120 may control the frequency of the second image signal DATA to be from about 240 Hz to about 120 Hz when the mode signal MODE indicates the 3D display mode.

Since the second gate driver 150 is not driven during the 3D display mode, the is power consumption in the 3D image display device 100 may be reduced compared to the power consumed in the 2D display mode. The signal used to drive the data line Di (1≤i≤m) in the 3D display mode may have a relatively low frequency, and thus the power consumption in the 3D image display device 100 may be reduced.

Figure 9:
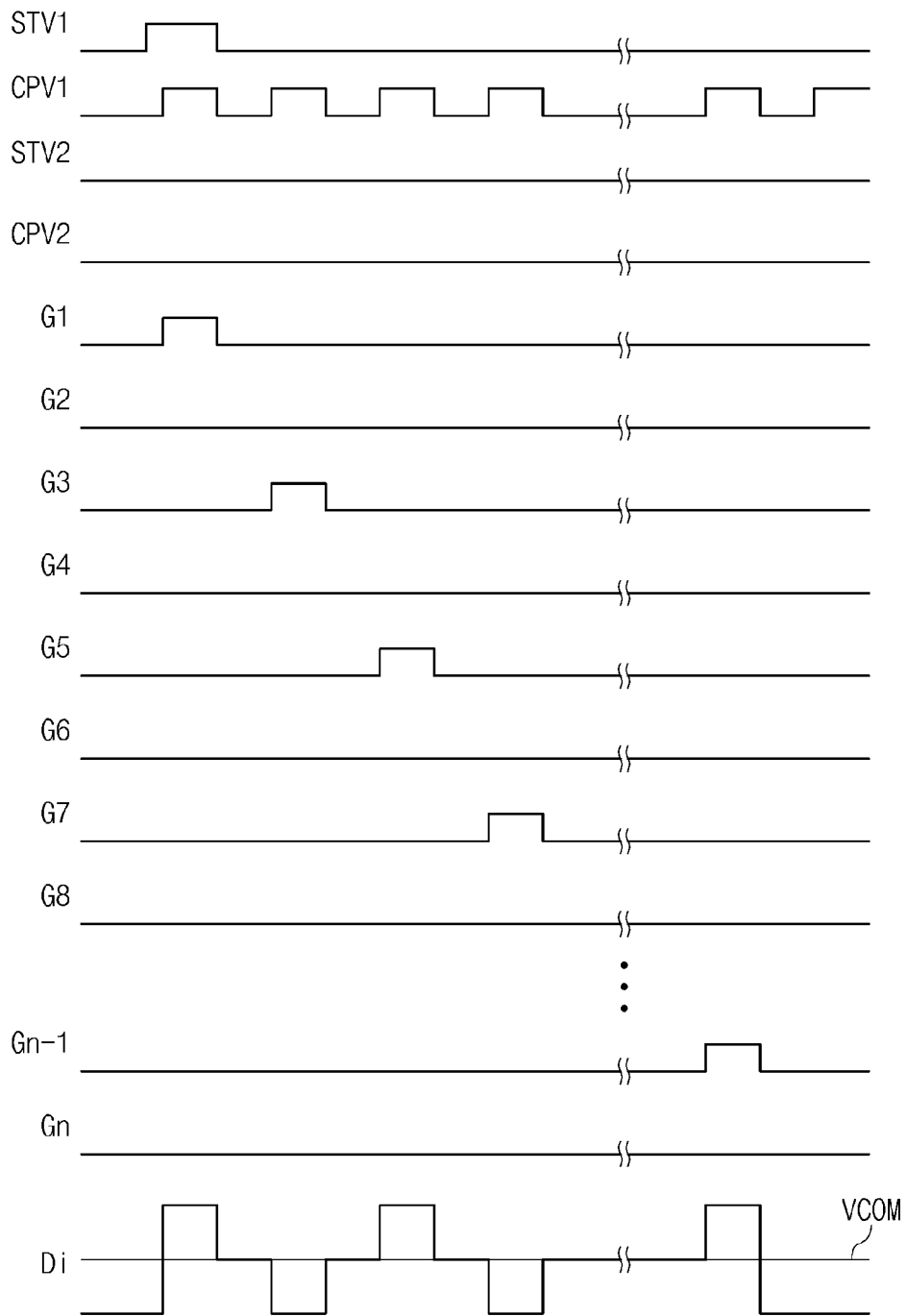
FIG. 9 is a timing diagram illustrating an operation of a 3D image display device in a 3D display mode according to an exemplary embodiment of the present invention.

FIG. 9 is a timing diagram illustrating an operation of a 3D image display device in a 3D display mode according to an exemplary embodiment of the present invention.

Referring to FIG. 9, the signal used to drive the data line Di (1≤i≤m) in the 3D display mode may have a frequency of about 240 Hz. The data line Di may be driven by the gray-scale voltage corresponding to the second image signal DATA and then driven by the common voltage VCOM if the first gate lines G1, G3, ..., Gn−1 are driven.

Figure 10:
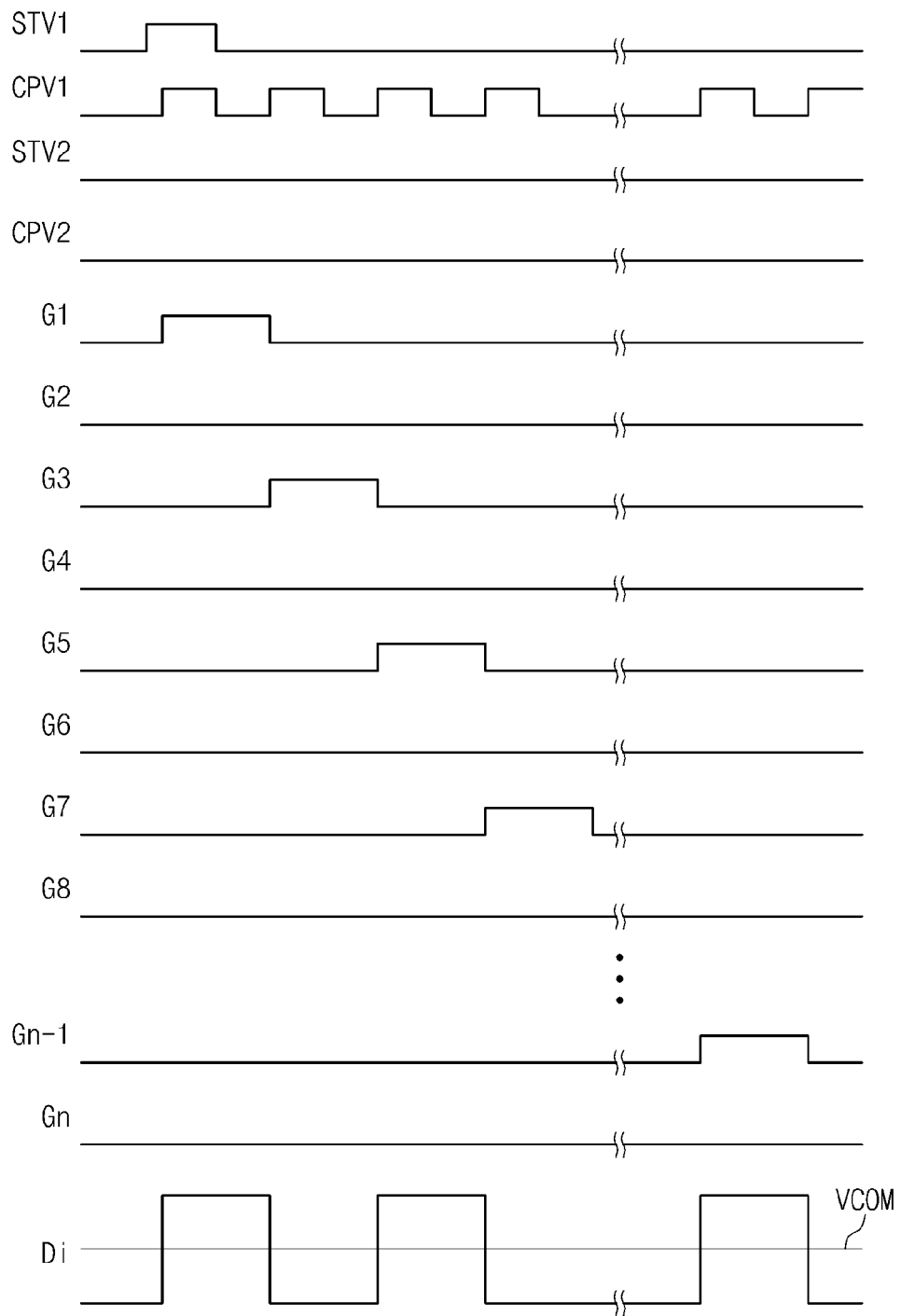
FIG. 10 is a timing diagram illustrating an operation of a 3D image display device in a 3D display mode according to an exemplary embodiment of the present invention.

FIG. 10 is a timing diagram illustrating an operation of a 3D image display device in a 3D display mode according to an exemplary embodiment of the present invention.

Referring to FIG. 10, a time interval during which the gate lines G1, G3, ..., Gn−1 are driven according to the gate-on voltage in the 3D display mode may be substantially the same as a time interval during which two adjacent first gate lines are driven in the 2D display mode.

Figure 11:
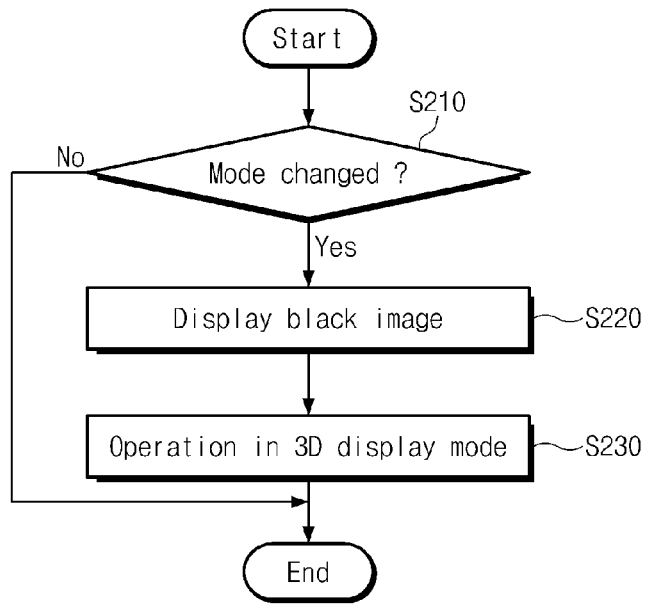
FIG. 11 is a flowchart of an operation of a 3D image display device according to an exemplary embodiment of the present invention.
Figure 12:
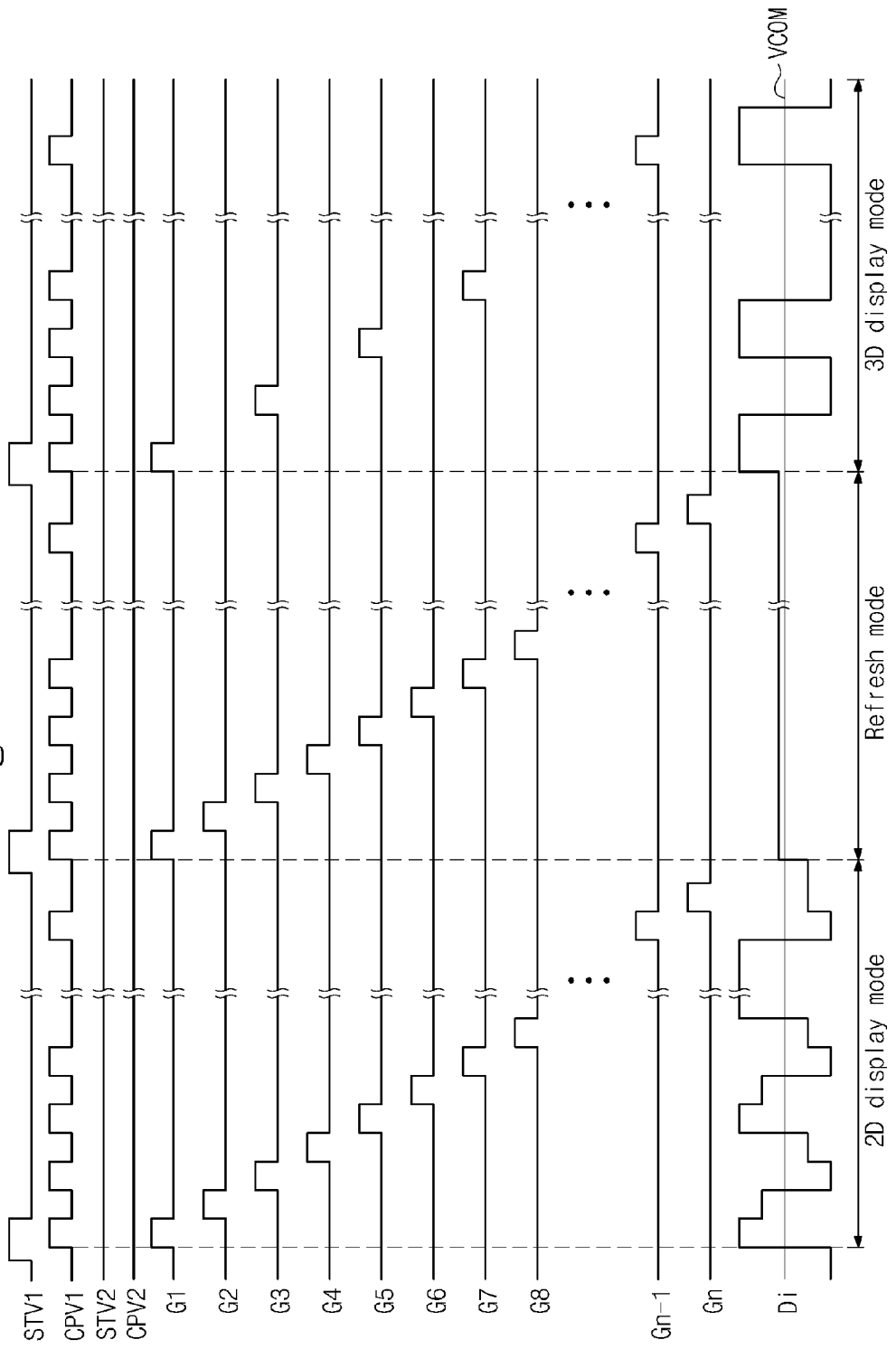
FIG. 12 is a timing diagram illustrating an operation of a 3D image display device.

FIG. 11 is a flowchart of an operation of a 3D image display device according to an exemplary embodiment of the present invention. FIG. 12 is a timing diagram illustrating an operation of a 3D image display device. Although FIG. 11 and FIG. 12 are described as if performed by the 3D image display device of FIG. 1, they are not limited thereto.

Referring to FIG. 11 and FIG. 12, in operation S210, the 3D image display device 100 operating in a 2D display mode determines if a switch to a 3D display mode is detected. The 3D image display device 100 determines if the mode signal MODE indicates the 2D display mode is to be changed to the 3D display mode. In operation S220, the 3D image display device 100 displays a black image if a signal to change from the 2D display mode to the 3D display mode is received. The timing controller 120 display the black image on the display panel 110 during a reference frame which may be a refresh mode. The refresh mode may be maintained for at least one frame.

During the refresh mode, the timing controller 120 may control the display panel 110 to allow the first pixel P11 to P(n−1)1 and second pixel P21 to Pnm to display a black image or to control the second pixels P21 to Pnm connected to the second gate lines G2, G4, ..., Gn to display the black image. The timing controller 120 may control the first pixels P11 to P(n−1)1 connected to the first gate lines G1, G3, ..., Gn−1 to display the 2D image of the previous frame while the second pixels P21 to Pnm connected to the second gate lines G2, G4, ..., Gn display the black image.

In operation S230, the 3D image display device 100 operates in a 3D display mode. After the black image is displayed on the display panel for the reference frame, the timing controller 120 controls the 3D image display device 100 to operate in the 3D display mode.

Although the second gate lines G2, G4, ..., Gn are not driven during the 3D display mode, the second pixels connected to the second gate lines G2, G4, ..., Gn may continuously display a black image since the second pixels connected to the second gate lines G2, G4, ..., Gn display the black image during the refresh mode.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A three-dimensional (3D) image display device, comprising:
   a plurality of data lines;
   a plurality of gate lines crossing the data lines;
   a plurality of sub-pixels arranged between the data lines and the gate lines;
   a data driver configured to drive the data lines;
   a first gate driver configured to drive first gate lines of the gate lines;
   a second gate driver configured to drive second gate lines of the gate lines; and
   a timing controller configured to control the data driver, the first gate driver, and the second gate driver according to an image signal and a control signal,
   wherein the second gate driver is not driven during a 3D display mode.

2. The 3D image display device of claim 1, wherein the timing controller is configured to control the first gate driver and the second gate driver to alternately and sequentially drive the first gate lines and the second gate lines during a two-dimensional (2D) display mode.

3. The 3D image display device of claim 2, wherein the timing controller applies a first start signal and a first gate clock signal to the first gate driver and applies a second start signal and a second gate clock signal to the second gate driver during the 2D display mode, and the timing controller applies the first start signal and the first gate clock signal to the first gate driver during the 3D display mode.

4. The 3D image display device of claim 2, wherein the sub-pixels comprise first sub-pixels connected to the first gate lines and second sub-pixels connected to the second gate lines.

5. The 3D image display device of claim 4, wherein if the 2D display mode is changed to the 3D display mode, the timing controller is configured to control the data driver and the second gate driver to display a black image in the second sub-pixels during a reference frame before operating in the 3D display mode.

6. The 3D image display device of claim 5, wherein the timing controller is operated according to a mode signal that indicates the 2D display mode or the 3D display mode.

7. The 3D image display device of claim 4, wherein the first sub-pixels comprise a red sub-pixel, a green sub-pixel, and a blue sub-pixel arranged successively in a first direction in which the first gate lines are extended, and the second sub-pixels comprise a red sub-pixel, a green sub-pixel, and a blue sub-pixel arranged successively in the first direction in which the second gate lines are extended.

8. The 3D image display device of claim 7, wherein a length of the first sub-pixels in a second direction is longer than a length of the second sub-pixels in the second direction, and the data lines are extended in the second direction, and the second direction is substantially perpendicular to the first direction.

9. The 3D image display device of claim 1, wherein the first gate driver and the second gate driver each comprise an amorphous silicon gate circuit.

10. The 3D image display device of claim 9, wherein the sub-pixels are disposed between the first gate driver and the second gate driver.

11. A method of driving a three-dimensional (3D) image display device that comprises a plurality of sub-pixels arranged between a plurality data lines and a plurality of gate lines crossing the data lines, the method comprising:
   receiving an image signal, a control signal, and a mode signal;

controlling a first gate driver according to the image signal and the control signal if the mode signal indicates a 3D display mode to drive first gate lines of the plurality of gate lines to be sequentially driven; and controlling a second gate driver if the mode signal indicates the 3D display mode to not drive second gate lines of the plurality of gate lines.

12. The method of claim 11, wherein the controlling of the first gate driver if the mode signal indicates the 3D display mode comprises applying a first start signal and a first gate clock signal to the first gate driver.

13. The method of claim 11, further comprising:

controlling a first gate driver according to the image signal and the control signal if the mode signal indicates a two-dimensional (2D) display mode to drive first gate lines of the plurality gate lines to be sequentially driven; and controlling a second gate driver according to the image signal and the control signal if the mode signal indicates the 2D display mode to drive second gate lines of the gate lines to be sequentially driven.

14. The method of claim 13, wherein the controlling of the first gate driver if the mode signal indicates the 2D display mode comprises applying a first start signal and a first gate clock signal to the first gate driver, and the controlling of the second gate driver if the mode signal indicates the 2D display mode comprises applying a second start signal and a second gate clock signal to the second gate driver.

15. The method of claim 11, further comprising controlling pixels connected to the first gate lines and second gate lines to display a black image in the pixels during a reference frame if the 2D display mode is changed to the 3D display mode.

16. The method of claim 11, wherein a length of the sub-pixels driven by the first gate driver in a first direction is greater than a length of the sub-pixels driven by the second gate driver in the first direction, and the data lines are substantially parallel to the first direction.

* * * * *